United States Patent [19]

Melia

[11] Patent Number: 4,991,310
[45] Date of Patent: Feb. 12, 1991

[54] BRAKE CHAMBER STROKE INDICATOR

[76] Inventor: Clifford T. Melia, 5617 Sundale Grove, Surrey, Canada, V3S 4N9

[21] Appl. No.: 443,976

[22] Filed: Nov. 30, 1989

[30] Foreign Application Priority Data

Sep. 19, 1989 [CA] Canada .................................. 611911

[51] Int. Cl.$^5$ ...................... G01D 21/00; F16D 66/02
[52] U.S. Cl. .................................... 33/609; 116/208; 188/1.11
[58] Field of Search .................. 33/609, 556, DIG. 2, 33/832, 837, 610, 485, 492, 836, 833; 116/208; 188/1.11

[56] References Cited

U.S. PATENT DOCUMENTS

| | | | |
|---|---|---|---|
| 597,335 | 1/1898 | Spalding | 33/836 |
| 1,427,113 | 8/1922 | March | 33/609 |
| 2,820,295 | 1/1958 | Fenemore et al. | 33/492 |
| 3,438,351 | 4/1969 | Kirkwood | 116/208 |
| 3,507,048 | 4/1970 | Owens | 33/610 |
| 3,533,491 | 10/1970 | Svenson | 116/208 |
| 4,279,214 | 7/1981 | Thorn | 116/208 |
| 4,757,300 | 7/1988 | Sebalos | 116/208 |

FOREIGN PATENT DOCUMENTS 3130237 10/1982 Fed. Rep. of Germany ..... 188/1.11
2574924 6/1986 France .................................. 33/836

Primary Examiner—Thomas B. Will
Attorney, Agent, or Firm—Townsend and Townsend

[57] ABSTRACT

A brake stroke indicator for use on an air brake having an elongated brake pushrod that travels a linear distance when the brake is applied. The length of the linear distance travelled depends upon the condition of the brake. The indicator comprises an elongated gauging probe having a plurality of grooves spaced at intervals along the length of the probe. Each such groove extends in a plane transverse to the longitudinal axis of the probe. A pushrod bracket is also provided having a flange for engaging the probe in the grooves as the probe is slid longitudinally across the flange. The pushrod bracket has clamping arms to allow attachment of the bracket at a preselected position along the length of the pushrod such that the flange extends in a plane transverse to the longitudinal axis of the pushrod.

6 Claims, 1 Drawing Sheet

BRAKE CHAMBER STROKE INDICATOR

FIELD OF THE INVENTION

This invention relates to air brake stroke indicators.

DESCRIPTION OF THE PRIOR ART

The mechanical adjustment of air brakes on trucks and other highway vehicles is a constant source of concern to vehicle owners and drivers and, as well, to police officers and other officials whose duty it is to inspect and to check the road worthiness of such vehicles. In the case of air brakes, various devices have been designed to assist and to expedite the process; some of which are very simple, others of which tend to be relatively complex and, in all likelihood, relatively costly.

Air brake systems commonly have a brake actuator that comprises an air pressure chamber and a flexible diaphragm that is linked to the brake by a pushrod having a linear travel that increases as the braking member such as a brake lining wears with use. One of the simplest kind of devices is a split ring plastic sleeve designed to slip over the air pressure chamber pushrod, and thereafter provide a visual indication of pushrod travel distance or stroke extension. Excessive pushrod travel indicates a level of brake lining wear that warrants replacement of the linings. Another device which likewise acts as a visual indicator involves modification to the pushrod itself. A coloured band is painted into a groove circumferentially machined in the pushrod.

Other known prior art includes U.S. Pat. No. 4,279,214 to Thorn that discloses a brake wear indicator for pneumatic brakes comprising a sleeve that fits over the push rod of the pneumatic actuator. When the brakes are applied, indicia on the sleeve can be observed to gain an indication of sleeve travel which corresponds to the push rod travel in the brake system.

U.S. Pat. No. 3,298,466 to Ayers et al. teaches a brake wear indicator comprising an extension of the return spring of the actuating cylinder of the system that extends from the interior of the actuating cylinder to the exterior where it is visible for inspection. When the brakes are applied, the return spring is compressed and the extension projects from the actuating cylinder. The greater the distance the extension projects the greater the wear of the brake linings.

The foregoing and other visual indicators are disadvantageous by reason of their dependence on vision. The ability to see can be hampered by darkness, or by dirt, mud or slush picked up from the road. Further, it can be an awkward and sometimes messy job to move into a position that enables a visual check to be made.

Other known prior art includes U.S. Pat. No. 3,533,491 to Svenson which discloses a brake shoe lining wear indicator for conventional drum brakes comprising a manually pressable pin that can be pressed into the interior of a brake drum through a hole in the dust shield of the brake to gauge the wear of the lining.

U.S. Pat. No. 4,757,300 to Sebalos teaches a brake adjustment monitoring device for vehicles that uses a magnetic sensing system to detect when brake lining wear is excessive. This arrangement requires that a magnet be attached to the push rod of the actuating cylinder and a magnetically sensitive switch by permanently mounted the actuating cylinder.

Indicators which require physical modification of the existing brake system are disadvantageous for the further reason that they are not readily adaptable to existing brake assemblies. Either the existing pushrod has to be removed, modified and reinstalled, or a new pushrod must be substituted. In either case, the time and cost involved can be significant.

SUMMARY OF THE INVENTION

The present invention provides a new and improved air brake stroke indicator which is not structurally complex and which does not depend upon vision for the purpose of checking brake adjustment.

The present invention also provides an air brake stroke indicator which can be removably attached to an existing air brake assembly without mechanical modification to existing components, and which can thereafter be used without dependence on vision.

Accordingly, the present invention is a brake stroke indicator comprising an elongated gauging probe having a first reference end and second end with a plurality of grooves spaced at intervals along the length of the probe, each groove extending in a plane transverse to the longitudinal axis of the probe;

a pushrod bracket, said bracket comprising a flange for engaging said probe in said grooves as said probe is slid longitudinally across said flange; and means for attaching said bracket at a preselected position along the length of said pushrod such that said flange extends in a plane transverse to the longitudinal axis of said pushrod.

The indicator of the present invention serves to gauge brake condition in two ways. Firstly, the user may simply "look" at the distance as measured by the probe in much the same way as he is expected to "look" at distance as measured by some of the prior art devices. As is described hereinafter, the probe may be colour-coded to enhance this approach if the user chooses to rely on vision. Secondly, however, the user may choose to rely on "feel". As discussed above, vision has its limitations. However, with the "feel" of the present invention as the probe is slid across the bracket flange, the user can reasonably gauge the condition of the brake by counting the number of times the flange engages a groove in the probe. The user is not required to visibly see what he is doing, and he can often avoid having to posture himself in awkward or messy positions in order to conduct a check.

The resolution which can be achieved by means of "feel" is a function of the number of grooves in the probe. Generally, the use of three grooves is preferred in order to delimit four ranges on the probe. The first range indicates when the brakes are adjusted too tightly, the second range indicates when the brakes are in good condition, the third range indicates when the brakes are in fair condition and caution should be exercised, and the last range indicates when the brakes are in a degraded condition which is very dangerous and unacceptable.

BRIEF DESCRIPTION OF THE DRAWINGS

Aspects of the present invention are illustrated, merely by way of example in the accompanying drawings in which.

DESCRIPTION OF THE PREFERRED EMBODIMENTS

Figure 1:
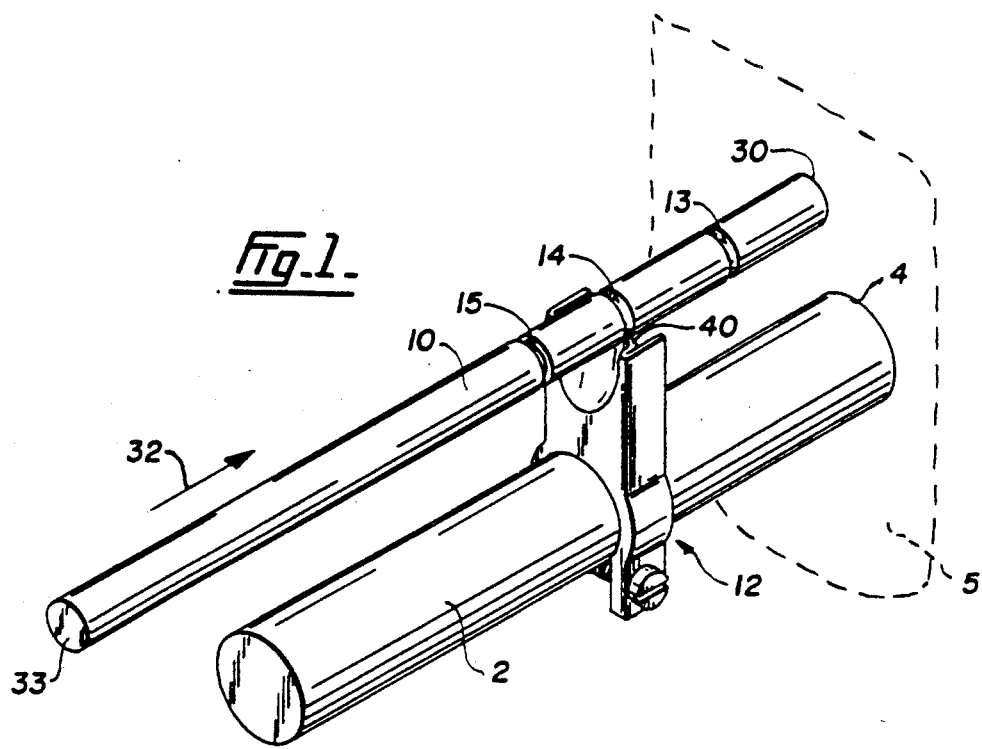
FIG. 1 is a perspective view of a brake stroke indicator in accordance with the present invention.
Figure 2:
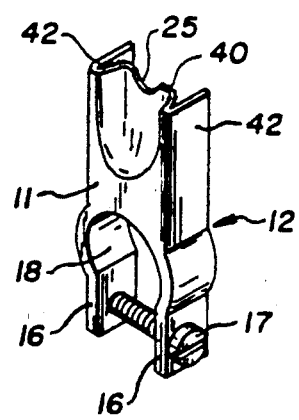
FIG. 2 is a detailed view of the mounting bracket.

A brake stroke indicator according to the present invention is shown in FIG. 1 in place on a brake pushrod 2 of a conventional pneumatic brake system. Pushrod 2 extends between an actuating pneumatic cylinder 5 and a conventional brake assembly (not shown). Pushrod 2 extends from within the actuating pneumatic cylinder, where it is connected to a flexible diaphragm, through aperture 4 in the pneumatic cylinder wall which is partially shown by dotted lines in FIG. 1. Pushrod 2 is movable through aperture 4 upon application of the brakes. The braking system just described is entirely conventional.

The brake stroke indicator of the present invention comprises an elongated gauging probe 10 and pushrod bracket 12.

In the illustrated embodiment, elongated gauging probe 10 is formed with first, second and third grooves 13, 14 and 15, respectively, spaced at intervals along the length of the probe, which each groove extending in a plane transverse to the longitudinal axis of the probe. Probe 10 has a cylindrical shape with each groove extending around the circumference of the probe. The probe is formed with a first reference end 30 and a second end 33. Preferably, all the grooves are formed with a semi-circular cross-section except for the groove most distant from reference end 30, in this case, groove 15. Groove 15 or the last groove on the probe has a rectangular cross-section.

Pushrod bracket 12 includes an upper portion 11 having means for attaching the bracket to a pushrod at a preselected position along the length of the pushrod. In the illustrated embodiment of the Figures, pushrod bracket 12 is formed from stamped sheet metal. The means for attaching the bracket comprises a pair of clamping arms 16 that define a central aperture 18 that is adapted to slidably accept pushrod 2. Clamping arms 16 are located about pushrod 2 by a threaded fastener 17 that extends between the arms 16. Fastener 17 is threaded through holes in the arms to bring the arms together in order to tightly clamp the bracket on pushrod 2.

The upper end of bracket 12 is formed with a central web 40 extending between a pair of side members 42. Central web 40 is formed with a semi-circular flange 25 dimensioned to engage circumferential grooves 13, 14 and 15 located on probe 10. When bracket 12 is attached to pushrod 2 by means of clamping arms 16, flange 25 extends in a plane transverse to the longitudinal axis of the pushrod.

It is to be understood that there is no mechanical coupling between probe 10 and bracket 12. Ordinarily, the probe 10 is carried as a separate member and can be carried for example in a breast pocket of a shirt. The relative position of probe 10 shown in FIG. 1 is one which is assumed only when the user holes the probe in that position.

The brake stroke indicator of the present invention is used in the following manner:

The brakes to be tested are applied. The user, with probe 10 in hand, reaches to fine bracket 12 which has been previously installed on pushrod 2. Reference end 30 of probe 10 is then positioned over flange 25 with the probe in sliding contact with the flange. Probe 10 is then longitudinally advanced over flange 25 toward actuating pneumatic cylinder 5 as indicated by arrow 32. It may be necessary to maintain a slight downward pressure on the probe against flange 25. As probe 10 is advanced toward cylinder 5, the various grooves may pass over flange 25 whereupon the probe will move downwardly as flange 25 engages the groove. This downward motion results in a momentary stop in the forward motion of the probe which can be easily felt by the person manipulating the probe. The probe is advanced until reference end 30 of probe 10 abuts actuating cylinder 5 to prevent further movement.

The distance from flange 25 to the actuating pneumatic cylinder 5, as gauged by the probe, serves as a direct measure of the distance the pushrod travels when the brakes are applied. Pneumatic cylinder 5 provides a reference surface to determine the distance that pushrod 2 moves when the brakes are applied which provides an indication of brake wear. The greater the movement of pushrod 2 necessary to apply the brakes the greater the wear of the brake linings.

Initially, bracket 12 is installed on pushrod 2 when the brakes and linings are in good condition. To provide a standard starting point, bracket 12 is installed on push rod 2 where the pushrod enters the actuating pneumatic cylinder when the brakes are not applied. As the brakes wear, pushrod 2 will tend to travel a greater distance from actuating cylinder 5 with the result that bracket 12 which is fixedly clamped to the pushrod will move further from the cylinder 5. Therefore, the greater the brake wear, the greater the travel of pushrod 2 and the further bracket 12 moves from actuating pneumatic cylinder 5. When probe 10 is used, the fewer times that flange 25 engages in a groove as the probe is moved toward actuating cylinder 5, the better the condition of the brakes. Referring to FIG. 1, the distance along the probe from reference end 30 to first groove 13 indicates that the brakes are actually too tight and there is insufficient clearance between the brake shoes and the brake drum when the brakes are not applied. The distance along the probe between first groove 13 and second groove 14 indicates that the brakes are in good condition, and the distance along the length of the probe between second groove 14 and third groove 15 indicates that the brakes are in fair condition and caution should be exercised. The length of the probe past third groove 15 to second end 33 indicates that the brakes are in poor or dangerous condition and should be immediately adjusted or replaced. Obviously, more than three groove can be formed in probe 10 to give finer gradations of brake wear.

The semi-circular cross-sections of grooves 13 and 14 allow the grooves to slide easily over flange 25. However, groove 15 with its rectangular cross-section will tend to catch and stay on flange 25 to give a definite warning to a person using the probe that they are entering the region that indicates the brakes are in poor or dangerous condition.

The brake stroke indicator of the present invention allows a user to detect brake wear simply by feel using the momentary stops which occur as the grooves engage in the flange while the probe is moved toward the actuating cylinder. The fewer stops the user detects, the better the condition of the brakes.

The present invention is not limited to being used by feel. Obviously, the various grooves of the probe can also be colour coded to serve as a visual indicator of brake wear.

By way of example, a probe for use on conventional pneumatic brakes has been developed which is five and a half inches long overall. The centre of first groove 13 is located five eighths of an inch from reference end 30, the centre of second groove 14 is located three quarters of and inch from the first groove, and the centre of third groove 15 is located half an inch from the second groove. The various sections of the probe as delimited by the grooves are painted white, green, yellow and red, in order, from the reference end 30 to second end 33 to provide a visual indication of the increasing need for attention to the brake adjustment as one moves along the probe.

Although the present invention has been described in some detail by way of example for purposes of clarity and understanding, it will be apparent that certain changes and modifications may be practised within the scope of the appended claims.

I claim:

1. A brake stroke indicator for an air brake having an elongated brake pushrod that extends a linear distance from an actuator housing when the brake is applied, the length of said distance depending upon the condition of said brake, said indicator comprising:
    an elongated gauging probe having a first reference end and second end with distance indicator means spaced at intervals along the length of the probe;
    a pushrod bracket, said bracket comprising a flange for engagement with said distance indicator means of longitudinally across said flange;
    and means for fixedly attaching said bracket at a preselected position along the length of said pushrod such that said flange extends in a plane transverse to the longitudinal axis of said pushrod whereby said gauging probe in slid longitudinally across said flange toward said actuator housing when the brake is applied, the distance between said actuator housing and said bracket, as measured by said probe, providing a measure of the travel distance of said brake pushrod to indicate brake wear, and said distance indicator means engaging on said flange providing definite stops to indicate various ranges of brake wear.

2. A brake stroke indicator as defined in claim 1 in which said distance indicator means comprises a plurality of grooves formed in said elongated gauging probe.

3. A brake stroke indicator as defined in claim 2 in which said probe has an overall elongated cylindrical shape, each of said grooves extending around the circumference of the probe.

4. A brake stroke indicator as defined in claim 3 in which said probe is formed with three spaced grooves and the distance along the length of the probe from said first reference end to a first one of said grooves indicates that said brake does not have sufficient clearance; the distance between said first groove and a second one of said grooves indicates that said brake is in good condition; the distance between said second groove and a third one of said grooves indicates that said brake is in fair condition and requires adjustment; and the distance between said third groove and said second end indicates that said brake is in poor condition and requires immediate attention.

5. A brake stroke indicator as defined in claim 2 in which the groove most distant from said probe reference end is formed with a rectangular cross-section adapted to engage said flange of said bracket, and the other grooves are formed with a semi-circular cross-section adapted to slide easily over said flange of said bracket.

6. A brake stroke indicator as defined in claim 1, wherein said attaching means comprises clamping means for removably clamping said bracket to said pushrod.

* * * * *